United States Patent [19]
Abel

[11] Patent Number: 5,207,904
[45] Date of Patent: May 4, 1993

[54] APPARATUS FOR COMPOSTING WASTE MATERIAL

[75] Inventor: Gunther Abel, Whistler, Canada
[73] Assignee: 396234 B C Ltd., Whistler, Canada
[21] Appl. No.: 729,535
[22] Filed: Jul. 15, 1991
[51] Int. Cl.⁵ .............................................. C02F 9/00
[52] U.S. Cl. ................................... 210/252; 210/155; 210/173; 210/175; 210/179; 210/180; 210/181; 210/202; 210/205; 210/218; 210/257.1; 210/259; 210/260; 210/319; 422/285; 422/286; 422/288; 422/289
[58] Field of Search ............... 210/173, 175, 180, 181, 210/155, 179, 205, 218, 252, 258, 259, 202, 257.1, 260, 219, 319; 422/285, 286, 288, 289, 307; 71/9, 12, 13, 14, 15, 23, 25, 901, 64.04

[56] References Cited

U.S. PATENT DOCUMENTS

| | | | |
|---|---|---|---|
| 2,246,224 | 6/1941 | Streander | 210/173 |
| 2,929,504 | 3/1960 | Lind et al. | 210/158 |
| 3,803,806 | 4/1974 | Komline, Sr. | 210/181 |
| 3,847,803 | 11/1974 | Fisk | 210/605 |
| 4,000,064 | 12/1976 | Romeu et al. | 210/180 |
| 4,204,959 | 5/1980 | Kreuzburg et al. | 210/218 |
| 4,627,116 | 12/1986 | Shimizu | 210/173 |
| 4,872,998 | 10/1989 | Dausman et al. | 210/202 |

FOREIGN PATENT DOCUMENTS 0181615 11/1985 European Pat. Off. .

Primary Examiner—Robert A. Dawson
Assistant Examiner—Sun Uk Kim
Attorney, Agent, or Firm—Brian M. Long

[57] ABSTRACT

Apparatus for composting biological waste material, comprising a screen for separating the waste material into solids and liquids, a sludge outlet for adding sludge to the solids to form a mixture therewith and a compacting section for compacting the mixture. Further sludge is mixed with the compacted mixture to form a further mixture therewith, which is composted in a composter. The liquid separated from the biological waste is screened to remove fine solids and the fine solids are added to the first-mentioned mixture prior to the compacting thereof, the liquid being added to the further mixture in the composting section.

8 Claims, 10 Drawing Sheets

APPARATUS FOR COMPOSTING WASTE MATERIAL

BACKGROUND OF THE INVENTION

1. Field of the Invention

The present invention relates a methods of and apparatus for composting a mixture of biological waste material and sludge.

More particularly, the present invention is useful, for example, for the treatment of biological waste and sludge by dewatering and composting to form fertilizer, and for the conversion of waste water into usable water or even into drinking water, and may be employed for the treatment of waste, in waste treatment plants, from municipal sewerage systems, industrial sewage treatment plants, and other sources of human and animal waste, for example slaughter houses, hospitals and other buildings, greenhouses and other agricultural installations. The present apparatus may be connected to or separate from sewers and is useful both in fixed installations and in mobile waste treatment apparatus.

2. Description of the Prior Art

Various types of apparatuses for the composting of waste materials are already known, which mostly are fed from the top, are ventilated from the sides and from below and are emptied at the bottom. These prior apparatuses employ a composting process which is very complicated and which results in many cold spots, and consequently mold fungus growth, and in addition they require a composting period of about three months.

In European Patent Application 85114214.1, in the name of Gunther Abel et al., there is disclosed a method of and apparatus for the treatment of biological waste and sludge which mitigate these disadvantages by making possible a trouble-free and intensive mixing of waste materials and also provide effective heat exchange.

In this prior method and apparatus, floating material and clarified sludge from sewage treatment plants and biological waste from domestic, industrial and other sources are treated, screenings, floating material and clarified sludge being separated, the biological waste being chopped up and the sludge being fed into the biological waste. More particularly, floating waste material is fed into a screening apparatus and passed into a mixing chamber, in which it is mixed with screenings, comminuted biological waste and recycled biological waste passing down through a chopping mechanism. The mixture is dewatered and compacted to about 50% solid content.

A first part of the compacted mass is fed to a mixing chamber to which clarified sludge is also supplied and is mixed with this sludge The remainder of the compacted mass is fed into an upwardly inclined auger, which is adapted to heat the material by heat exchange. The material is also aerated and is thus composted over a period of 5-10 days. The compost is sieved and bagged.

The separated first part of the compacted mass, mixed with the clarified sludge, is fed to another auger, in which heat exchange is also effected.

The two augers are coaxial and insulated in order to conserve heat, and the apparatus is mobile for transfer between sewage treatment plants at different locations.

Activated sludge is also supplied to the mixing chamber from a settling tank and an inlet is also provided for the flow of fresh sludge into the mixing chamber.

This prior method and apparatus utilize two different types of bacteria, namely aerobic bacteria and anaerobic bacteria, in two endless paths of travel. Also, they enable the material being treated to be compacted only to about 50% of its original volume.

BRIEF SUMMARY OF THE INVENTION

It is an object of the present invention to provide a novel and improved composting method and apparatus which substantially simplify the composting of waste material by employing only aerobic bacteria.

It is a further object of the present invention to enable a substantially increased compaction of waste material.

According to the present invention, there is provided a method of composting waste material and sludge in which biological waste material is firstly dewatered to separate solids from liquid. The solid material thus obtained is then compacted, while being advanced along a path of travel, in order to further reduce its liquid content and also to form a substantially liquid-tight mass in order to prevent liquid from passing rearwardly along the path of travel of the material.

Sludge is then added to the material and the resulting mixture is further compacted and formed into extruded portions.

These extruded portions are then aerated and heated in order to initiate decomposition of the mixture, while methane and other gases given off from the decomposing mixture are condensed.

Micro-sludge, i.e. sludge containing only small-sized solid material, is then added to the mixture, which is subsequently further composted. This micro-sludge may be obtained from an external source or by additional screening of the liquid previously removed from the biological waste material.

BRIEF DESCRIPTION OF THE DRAWINGS

Various features, objects and advantages of the present invention will be more readily apparent from the following description of an embodiment thereof given, by way of example, with reference to the accompanying drawings, in which.

THE PREFERRED EMBODIMENT

Figure 1:
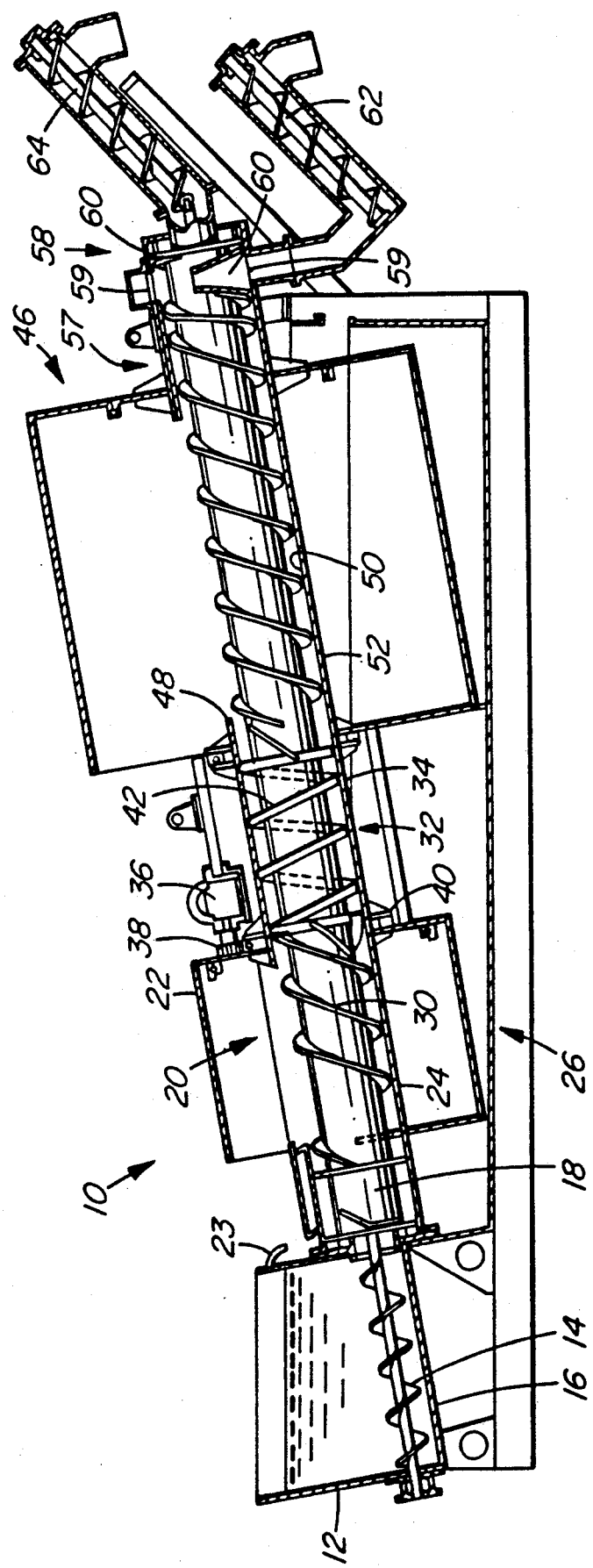
FIG. 1 shows a view in vertical longitudinal cross-section through a dewatering, compacting and extruding machine forming part of the preferred embodiment of the present invention.

As shown in FIG. 1 of the accompanying drawings, a waste material dewatering, compacting and extruding machine indicated generally by reference numeral 10 has an input end provided with an input tank 12 for receiving a mixture of sand and/ gravel or other solid material and water. An auger 14 is provided for feeding this solid material along a closed semi-cylindrical bottom wall 16 of the hopper 10 into the hollow interior of a cylindrical tube 18, which forms part of another auger indicated generally by reference numeral 20.

The auger 20 extends through a screen or basket 22, which is formed of co-axial and axially spaced endless bars, as described in greater detail below, and which is intended to receive biological waste material comprising a mixture of solids and liquid from the input tank 12 through an overflow spout 23. The liquid drains through the screen 22, while the solids are retained within the screen 22 by the endless bars and deposited, by rotation of the screen 22, into the auger 20 for conveyance thereby.

The auger 20, within the screen 22, extends along an underlying semi-cylindrical array of bars 24 extending parallel to the axis of the auger 20. Water from the biological waste material fed onto the auger 20 drains through the bars 24 into a tank indicated generally by reference numeral 26. The solids in this biological waste material are retained by the bars 24 and are conveyed along the exterior of the auger tube 18 by helical blades 30 forming parts of the auger 20.

The solid material is fed by the auger 20 into a compactor/chopper section indicated generally be reference numeral 32, which has an external tubular housing 34 mounted for rotation about the tube 18.

An electric motor 36, through a pinion 38, rotates a toothed wheel 40 mounted on one end of the tubular housing 34 for effecting the rotation of the latter and of the screen 22.

Helically-shaped bars 42 are welded to the interior surface of the tubular housing and to the outer peripheral edges of helical cutter blades 44 (FIG. 2), which in turn are welded to the exterior surface of the tube 18. In this way, rotational drive is imparted from the external tubular housing 34 to the tube 18 and, thus, to the entire auger 20, as well as the cutter blades 44.

Figure 2:
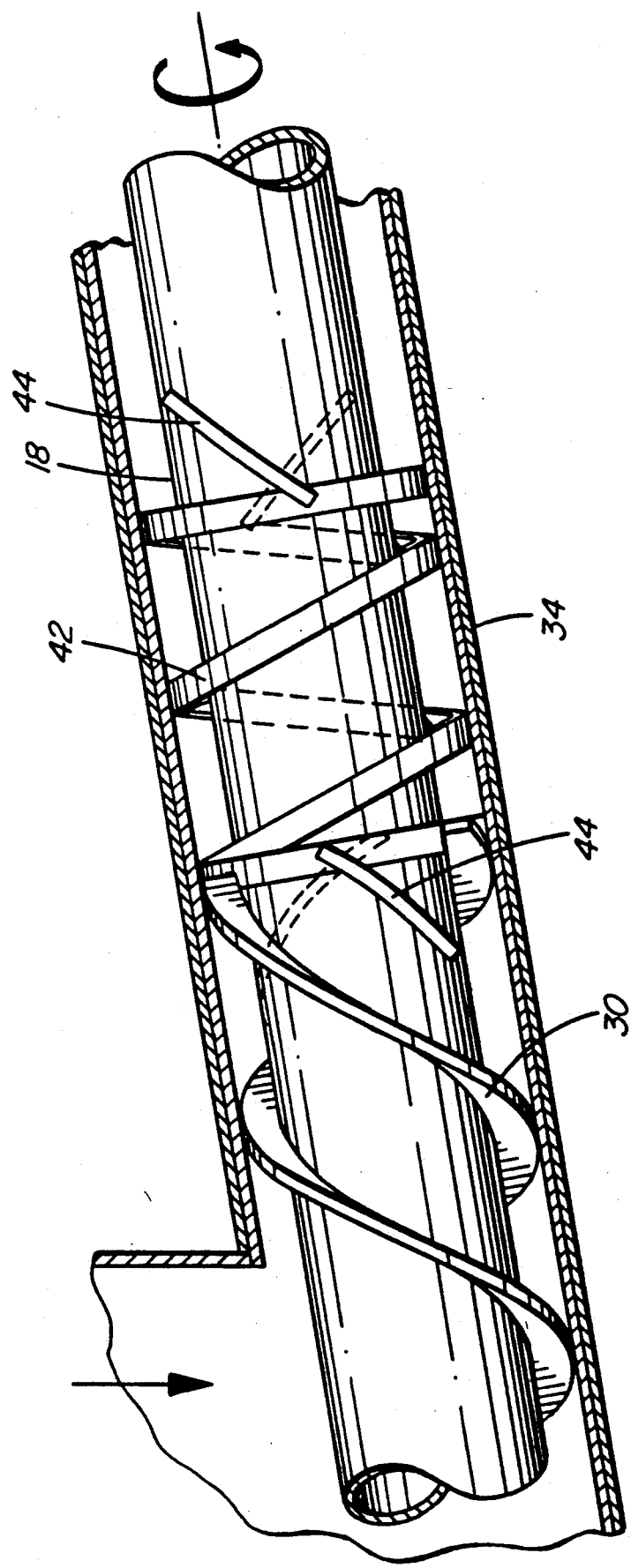
FIG. 2 shows a broken-away view of a modification of a compactor forming part of the machine of FIG. 1.

The compactor/chopper section 32 shown in FIG. 2 differs from that of FIG. 1 in that it is shorter, but it is otherwise similar to that of FIG. 1.

The cutter blades 44 are shaped to effect axial compression and compaction of the solid material fed thereto by the auger 20, while simultaneously chopping the thus-compacted solids.

The compacted and chopped solids are forced from the compactor/chopper section 32 into a portion of the auger 20 extending through a second screen indicated generally by reference numeral 46.

Within the second screen 46, a section of the tube 18 provided at its top with an opening 48 extends along an underlying semi-cylindrical array of longitudinally extending, and laterally spaced, straight bars 50, which are parallel to the axis of the tube 18. A semi-cylindrical micro-screen 52 underlies the bars 50.

Sludge fed into the hopper 48 is mixed with the solids being fed along the tube 18, and the resulting mixture is drained through the micro-screen 52.

The screen 46 has peripheral micro-screens 54 extending around the exterior of co-axial, axially spaced screen bars 56 (FIG. 5), and receives liquid from the tank 26. By means of the micro-screen 54, fine solids are separated from this liquid and deposited onto the auger 20, as described in greater detail below. These fine solids may, for example, be solids small enough to have fallen downwardly through the bars 24 in the screen 22.

The compaction of the solids by the compactor/chopper section 32 forms a relatively tight mass of compacted material which prevents liquid from draining downwardly along the tube 18 into the compactor/chopper section 32 from the hopper 48.

From the section of the auger 20 within the second screen 46, the mixture is advanced along the tube 18 into a second compactor section indicated generally by reference numeral 57, in which the turns of the helical auger blades 30 are spaced more closely together so as to compact the material conveyed thereby.

From the compactor 57, the compacted material passes into an extruder indicated generally by reference numeral 58.

The extruder 58 has a pair of compactor rotors 60 secured to opposite sides of the tube 18 and each being shaped to extrude the material radially outwardly through slot shaped openings 59 in a cylindrical housing 60. The material is thus extruded into a relatively thick strip-shaped extrusion, which repeatedly breaks across the width of the extrusion to form substantially brick-shaped pellets or extrusion portions.

These extrusion portions are removed in an upwardly inclined direction by an auger 62, and the sand, gravel and the like fed through the tube 18 by the auger 14 is likewise removed by an auger 64 extending parallel to the auger 62.

Figure 5:
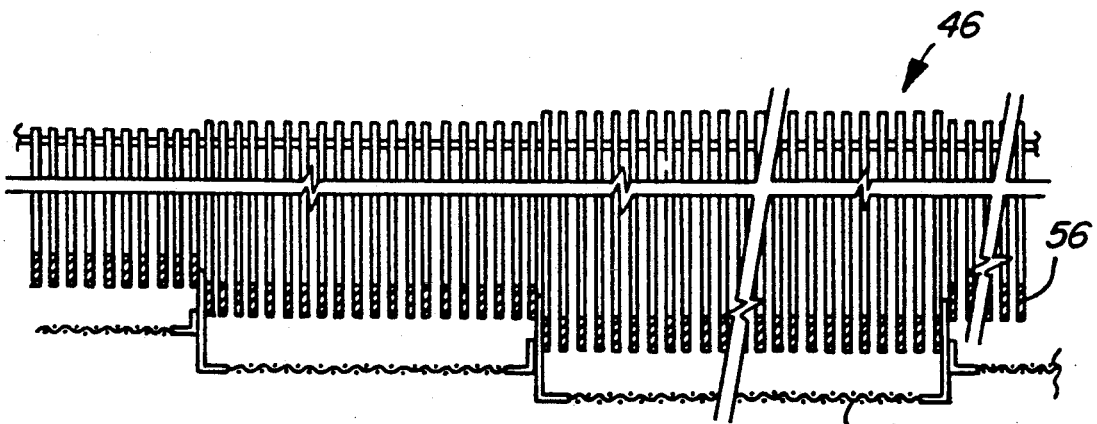
FIG. 5 shows a view in section through parts of the screen of FIG. 4.

As shown in FIG. 5, which is a broken-away view in vertical cross-section through a part of the second screen 46, the screen bars 56 are provided in three different sizes, which are grouped in sets so as to present a series of steps along the axial length of the screen. Such a formation has been found to promote the separation of the solids and the liquids by more securely retaining the solids on the inner peripheries of the bars 56.

Figure 4:
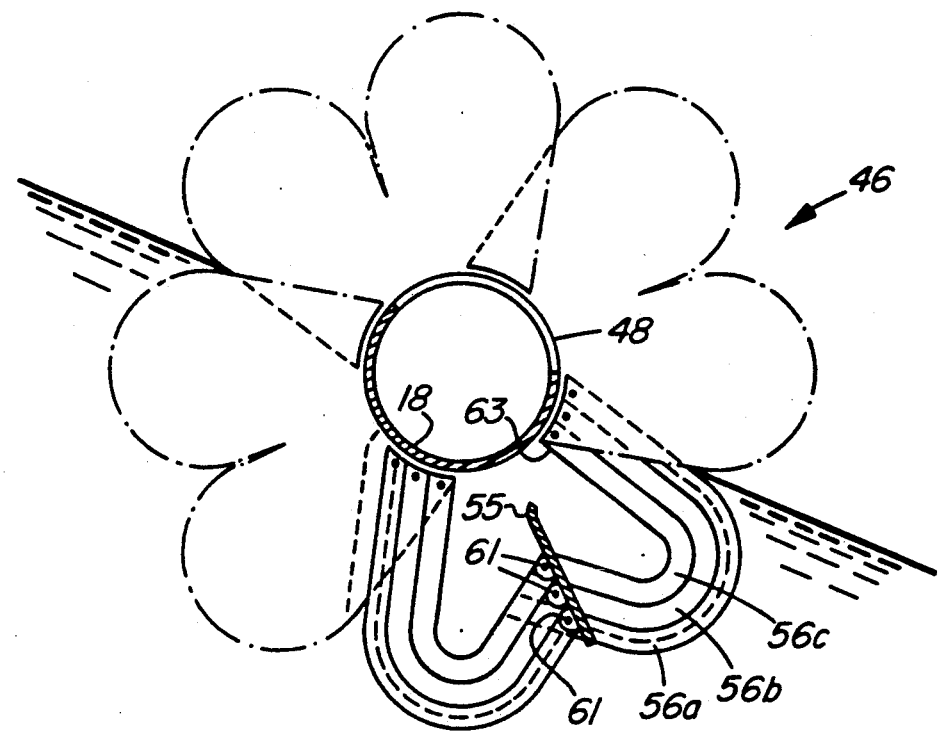
FIG. 4 shows a diagrammatic end view of parts of a screen forming part of the apparatus of FIG. 1.

The shape of the bars 56 is illustrated in FIG. 4, which shows bar components 56a–56c of three different sizes, which are each in the general shape of a "J" and which are connected together in opposed pairs, by means of longitudinal rods 61, to form radially inwardly open recesses 63.

A radially and longitudinally extending plate 55, which is mounted on the rods 61, protrudes into each recess 63 and serves as a scoop for directing the solid waste material, which collects on the bars 56, into the longitudinally extending opening 48 in the top of the cylindrical tube 18 containing the auger 20.

Figure 6:
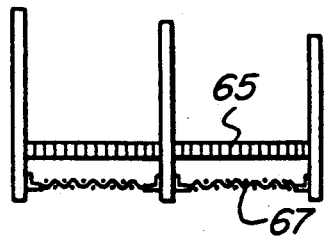
FIG. 6 shows a broken-away view in longitudinal cross-section through parts of another screen of the apparatus of FIG. 1.

The screen 22, of which a broken-away portion is shown in FIG. 6, is constructed of bars 65 which are similar in shape to that of the bars 56 of the screen 46, and which are provided externally of the bars 65 with a microscreen 67 extending peripherally of the screen 22.

Figure 3:
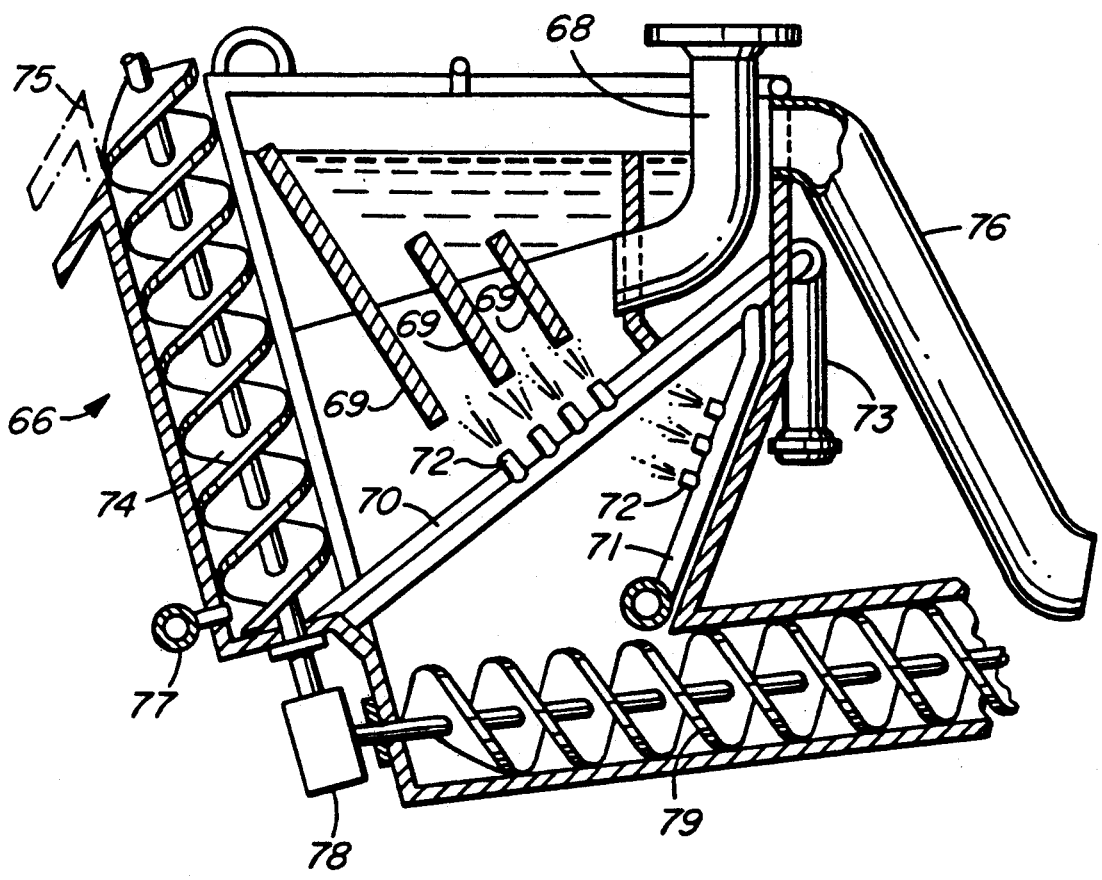
FIG. 3 shows a view taken in vertical cross-section through a modification of an input tank of the machine of FIG. 1.

The modification of the input tank 12, illustrated in FIG. 3 and indicated generally by reference numeral 66, has an input pipe 68 for the inflow of the waste material, and spaced baffles 69 which cause floating material to rise and sand to fall within the tank 66. Beneath the baffles 69, air input pipes 70 and 71 are provided with air discharge nozzles 72 for aerating the contents of the tank and causing the floating material to rise. The air is supplied through an inlet pipe 73, and the pipes 70 form a grid for catching large rocks and other large solid objects and deflecting them to an auger 74. The auger 74 extends up one end of the tank. An output pipe 76 directs the liquid and floating waste material into the tank 26. An air outlet 77 discharges air into the auger 74 for removing floating material and sand from the auger 74. A common drive 78 rotates the auger 74 and also an auger 79, which replaces the auger 14 of FIG. 1 and thus serves to remove sand from the bottom of the tank 66 to the interior of the tube 18.

Figure 7:
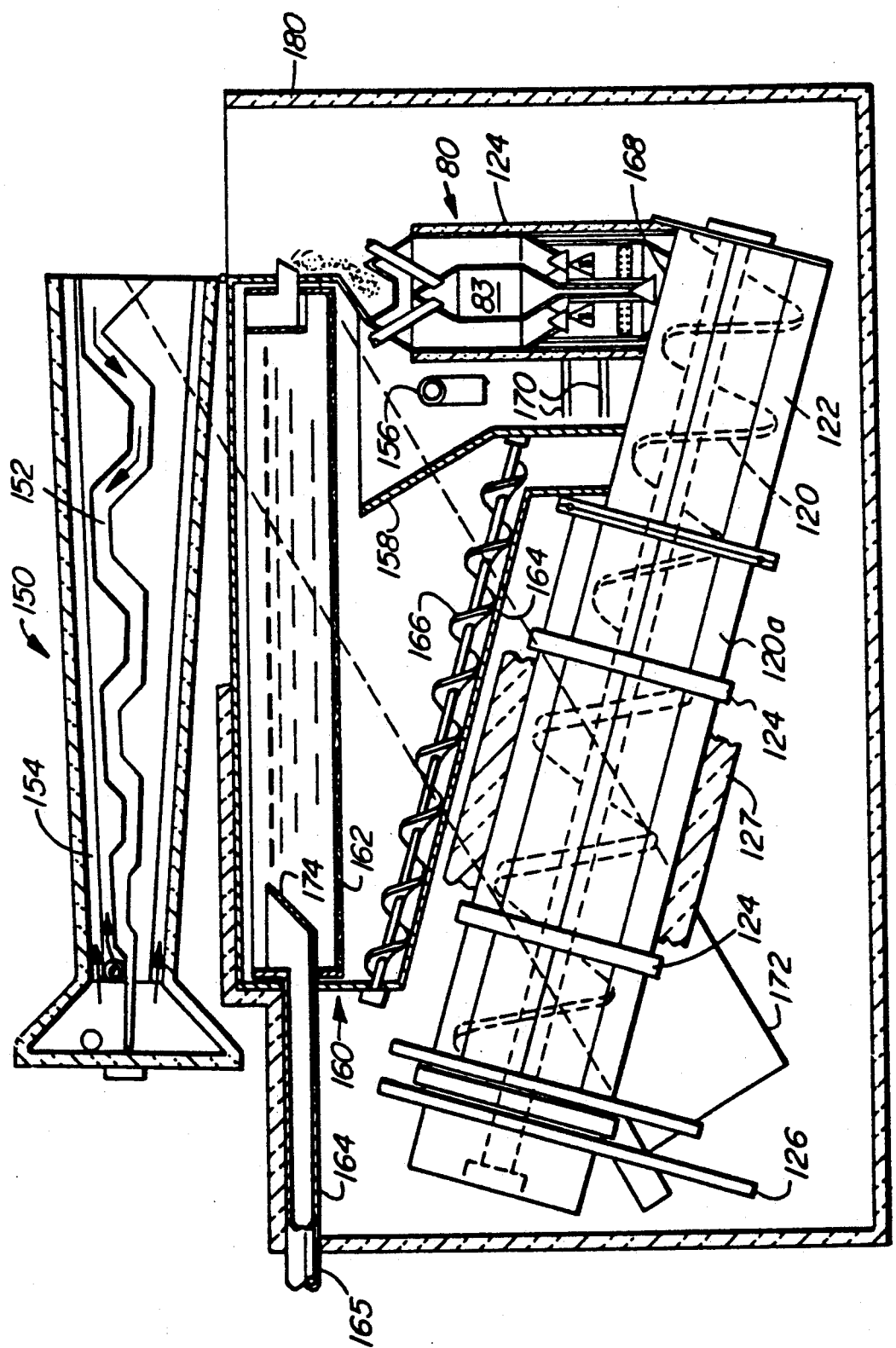
FIG. 7 shows a view in vertical cross-section through a mixing and composting apparatus forming another part of the preferred embodiment of the invention.
Figure 9:
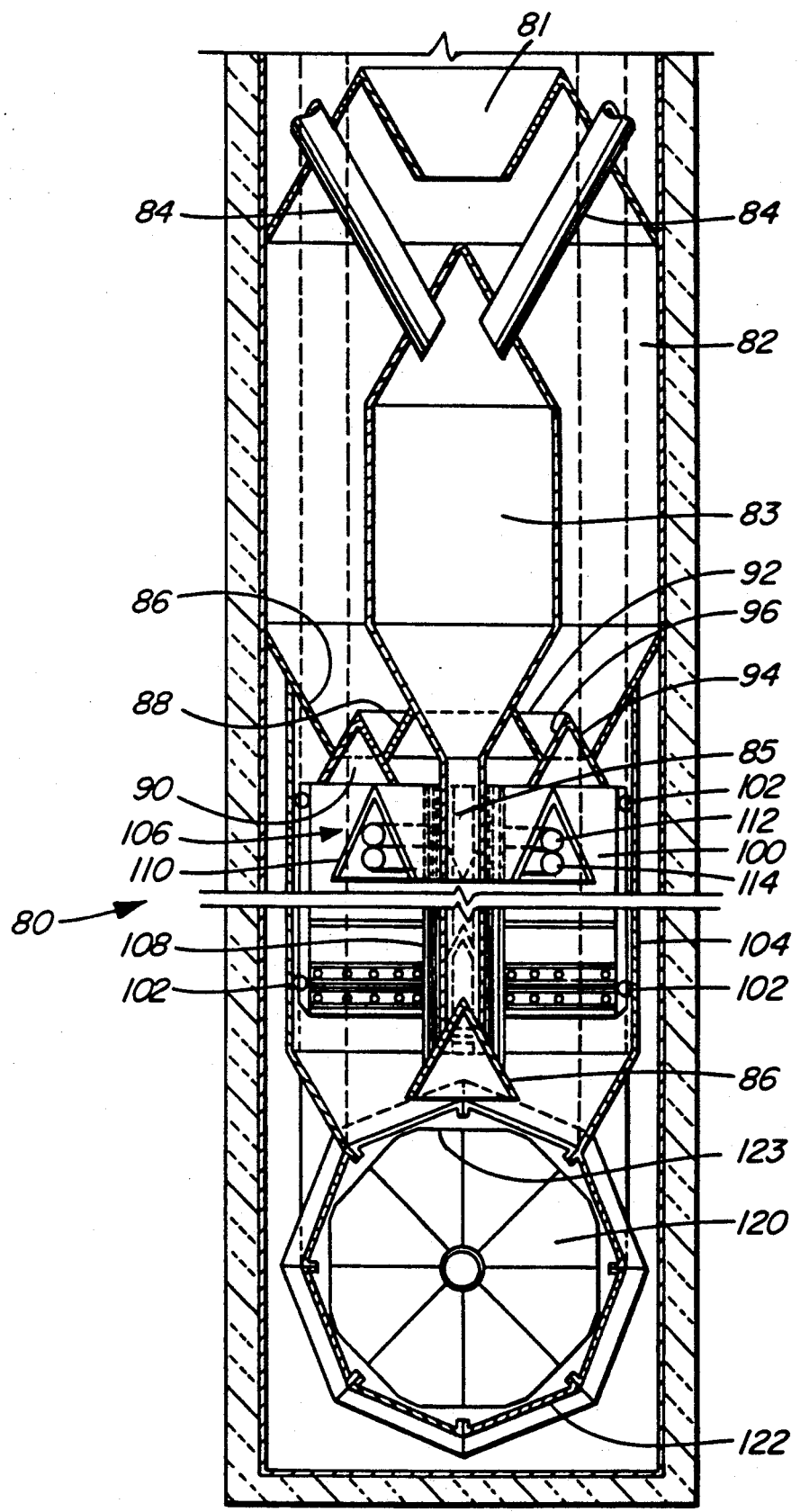
FIG. 9 shows a view taken in vertical cross-section through a pre-composter forming part of the apparatus of FIG. 7.

Turning now to FIGS. 7 and 9, the compressed extruded solid material portions conveyed by the auger are deposited into a pre-composting apparatus indicated generally by reference numeral 80 in FIGS. 7 and 9.

The pre-composting apparatus 80 has a vertical top inlet funnel 81 for receiving the compressed, extruded solid material portions from the auger 62 of FIG. 1 and directing them into an outer chamber 82, which extends around a central chamber 83. A pair of inlet pipes 84 extend into the central chamber 83 for supplying additives to the chamber 83. An outlet pipe 85 extends from the bottom of the chamber 83 and bottom of this outlet pipe is provided with a conical closure 86. The closure 86 is reciprocated vertically, as described below, so as to alternately open and close the bottom of the outlet pipe 85 and thus control the outflow through the outlet pipe 85.

The bottom of the outer chamber 82 is formed by opposed frusto-conical walls 86 and 88, which are spaced apart at the bottoms thereof to define therebetween an annular outlet opening 90. An annular closure 92, formed by upwardly convergent annular walls 94 and 96, is vertically reciprocated, as described below, so as to periodically open and close the opening 90 and thereby control the movement under gravity of the waste material downwardly through the opening 90 from the chamber 82 into an underlying cylindrical chamber 100.

The cylindrical chamber 100 is guided by bearings 102 for vertical displacement within a cylindrical housing 104, which is fixed in position.

Within the cylindrical chamber 100 a plurality of arms, one of which is indicated generally by reference numeral 106, project radially outwardly from a central tube 108, which is co-axial with the outlet pipe 84. Each arm 106 has a pair of upwardly convergent walls 110 containing between them a pair of outlet pipes 112 and 114, which serve to discharge air and water into the interior of the chamber 100.

Beneath the cylindrical chamber, there is an auger 120 for receiving the solid material which drops under gravity past the arms 106. The auger 120 is in a hexagonal auger housing 122 and rotates together with a cam 123 which, by sliding contact with the closure 86, vertically reciprocates the cylindrical housing 100, the arms 106 and the tube 108.

The annular closure member 90 is mounted on the top of the cylindrical chamber 100 for reciprocation therewith and thus alternately opens and closes the opening 90, as described above.

In this way, the material in the chamber 100 is aerated and moistened, and may also if required be heated by the use of hot air, to promote the initiation of decomposition of the material fed through the chute 81. Also, if required, the pre-composting apparatus 80 may be heated by heat exchange from a heat-exchange jacket (not shown) to facilitate the composting effect.

Gases given off from the decomposing material pass upwardly into a chimney indicated generally by reference numeral 150 (FIG. 7), where they are condensed in a chimney flue 152 by heat exchange with a cooling fluid travelling downwardly at the exterior of the flue.

The heat exchange fluid, heated in this way, may then be supplied to the above described heat-exchange jacket of the pre composting apparatus 80 and/or may be utilized for heating other regions of the apparatus, thus promoting the composting process.

Biological sludge is also fed downwardly through an outer passage 154 in the chimney 150, so as to be heated by the hot gases in the flue 152, and is then discharged through an outlet pipe 156 at the exterior of the precomposting apparatus 80. A further heat-exchange fluid, e.g. air or water, may be fed down an intermediate passage 157 between the flue 152 and the outer passage 154.

The chimney 150 is pivotable between a collapsed position, in which it is illustrated in FIG. 7, and a raised position (not shown), in which it extends vertically at the right-hand side of the apparatus.

The sludge outlet pipe 156 is located in a funnel-like enclosure 158 within a settling tank indicated generally by reference numeral 160. The tank 160 has, at an upper portion, an upwardly convex, semi-cylindrical filter screen 162. The enclosure 158 acts as a weir to retain at least a portion of the solid content of the sludge within the enclosure 158.

Sediment collecting on a downwardly inclined bottom 164 of the tank 162 is fed downwardly to the right-hand side of the tank, as viewed in FIG. 7, by means of an auger 166.

The partially composted material in the pre-composting apparatus 80 descends into the auger housing 122 through an opening 168 at one end of the housing 122.

Also, the sediment conveyed by the auger 166 and the descending sludge solids passing directly from the outlet pipe 156, proportioned under the control of flap valves 170, are deposited through the opening 168 into the housing 122 so as to be mixed with the partially composted material.

The resulting mixture is conveyed along the upwardly inclined auger housing 122 by means of the auger 120. The housing 122 has an intermediate housing portion 122a which is rotatable in bearings 124 and which is connected to the auger 120 for rotating the auger 122. The auger 122 may be hollow for containing heating fluid to promote the composting of the waste material. The rotation of the housing portion 120a is effected through an electric motor and drive transmission 126. A heat-insulating jacket 127 is provided around the housing 120.

From the upper end of the housing 120, the composting material falls into the lower end of a second upwardly inclined auger housing 172, in which the composting is completed.

Liquid in the tank 160 which rises through the filter screen 162 can flow over a weir 174 into a pipe 164, which may be connected so as to discharge the liquid into the material being composted within the auger housing 122, or into a pipe 165 for discharge from the apparatus.

An air outlet nozzle 173 (FIG. 8) is provided in the tank 160 for aerating the liquid in the tank 160.

Figure 8:
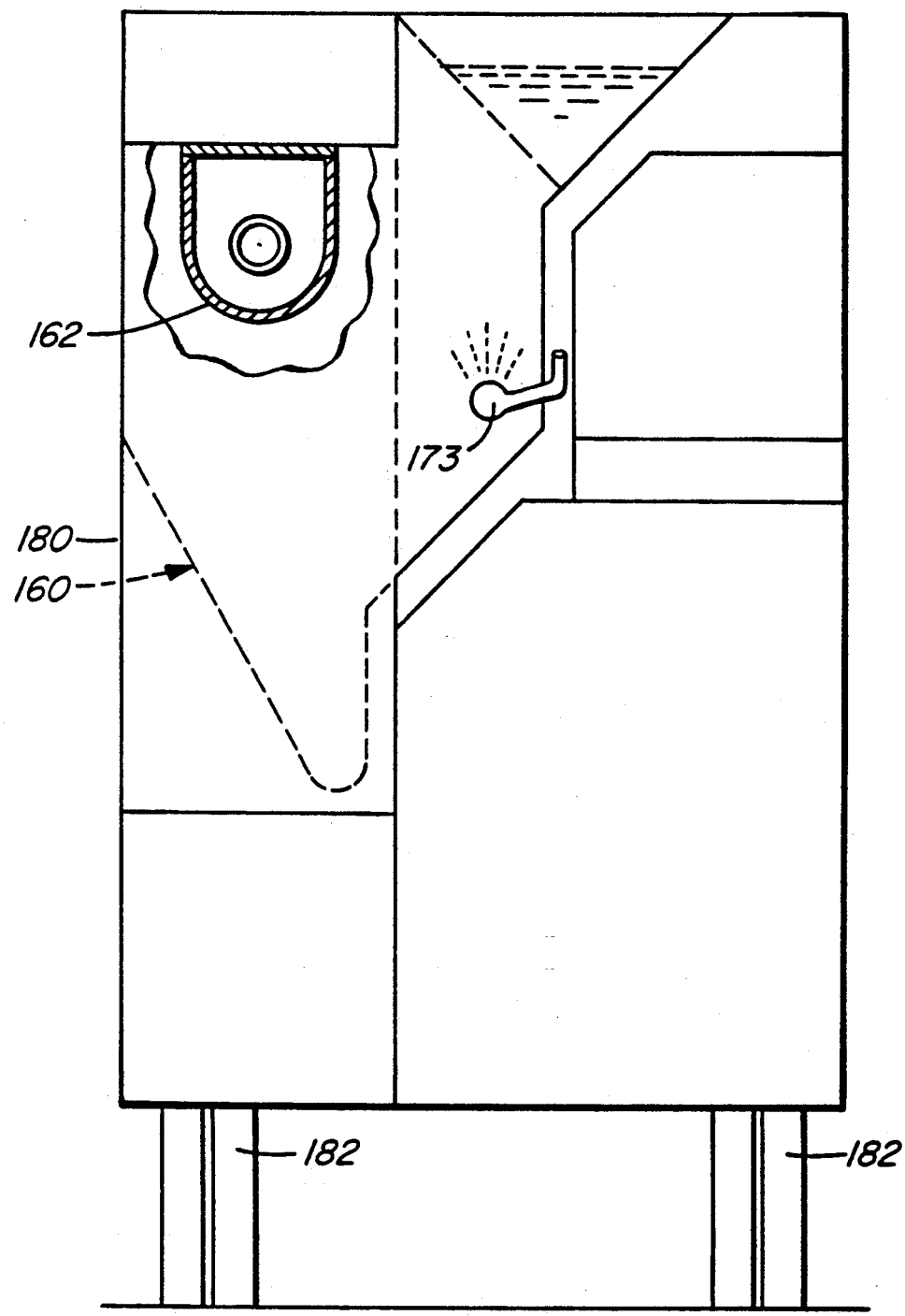
FIG. 8 shows an end view, partly broken away in section, of the apparatus of FIG. 7.

As shown in FIGS. 7 and 8, the above-described apparatus is accommodated within a heat-insulated housing 180, which retains heat within the interior of the housing 180 to promote the composting of the waste material in the augers. The housing 180 is mounted on wheels 182, so that the apparatus is mobile and can thus be moved from site to site, as needed.

Figure 10:
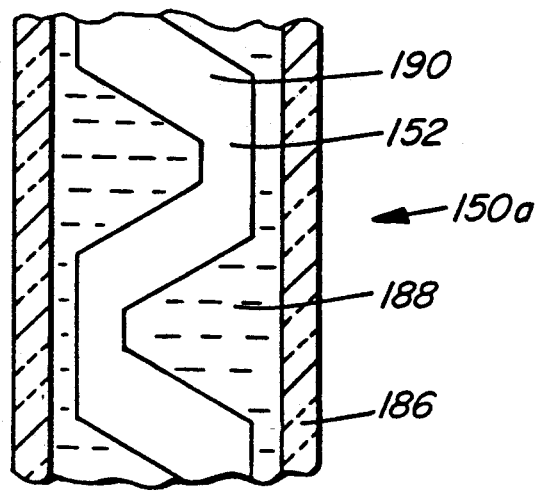
FIGS. 10, 11 and 12 show broken-away views in vertical cross-section through three modifications of a chimney stack forming part of the apparatus of FIG. 7.
Figure 11:
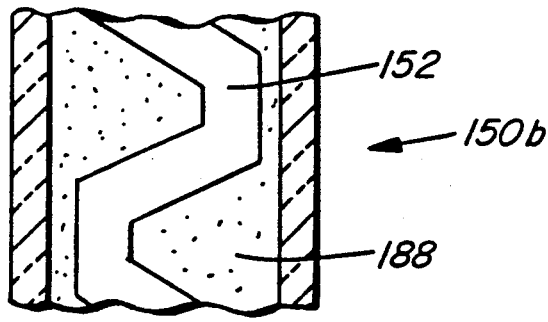
Figure 12:
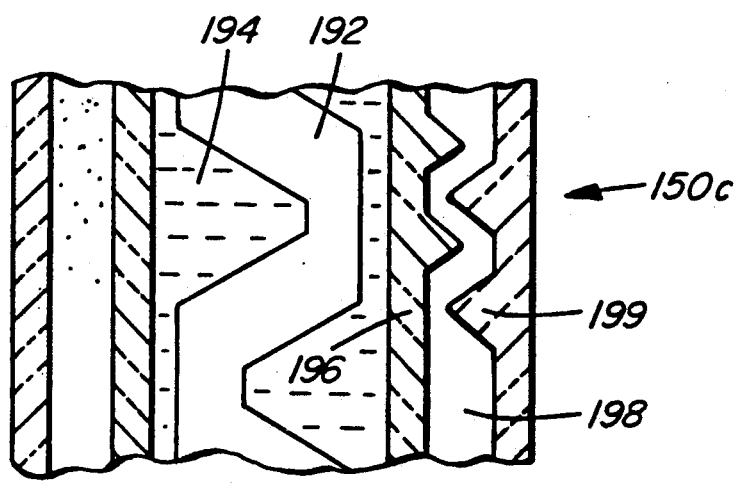

FIGS. 10, 11 and 12 show broken-away views, in vertical cross-section, through chimneys indicated generally by reference numerals 105a, 150b and 150c, respectively, which are modifications of the chimney 150 of FIGS. 7 and 8.

Chimney 150a has an outer jacket 186 of heat-insulating material surrounding an outer passage 188 containing a flowing or stationary cooling fluid around a flue 190.

Chimney 150b is similar to chimney 150a except that in this case the passage 188 contains a heat-exchange medium.

Chimney 150c has, around a flue 192, a passage 194 for containing a cooling or heating fluid, an intermediate jacket 196 of heat-insulating material, a second flue 198 at the exterior of the jacket 196, and an outer jacket 199 of heat-insulating material.

The above-described chimneys may be used in a vertical position or an inclined position.

Figure 13:
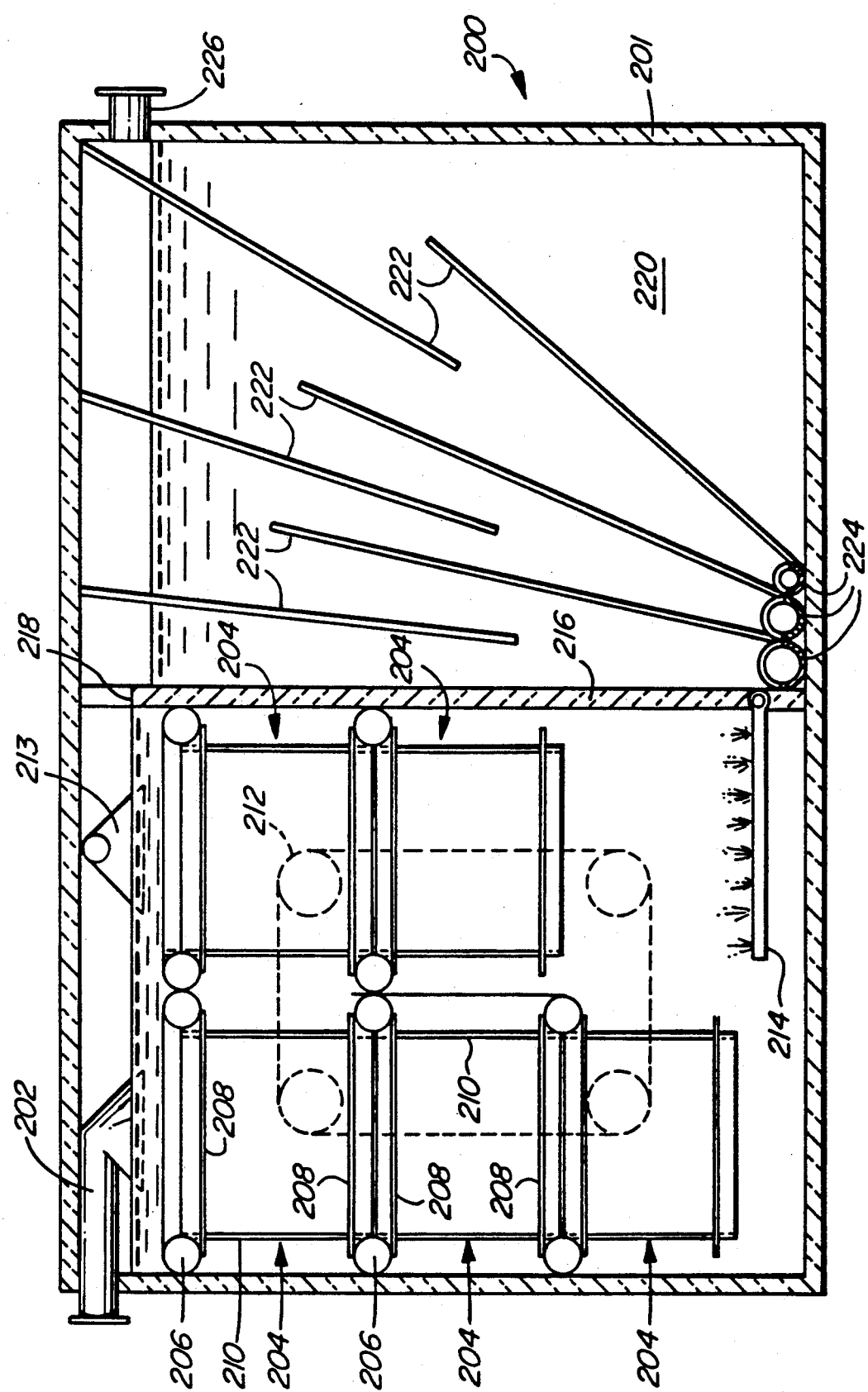
FIG. 13 shows a view in vertical cross-section through a cooling/clarification tank for use with the apparatus of FIGS. 1 through 9.

FIG. 13 shows a view taken in vertical cross-section through a cooling-clarifying tank indicated generally by reference number 200 provided with a heat-insulating jacket 201. The tank 200 has in inlet pipe 202 for introducing into the interior of the tank the water flowing from the apparatus of FIG. 7 through the pipe 165. The pipe 202 discharges downwardly into a filtering arrangement which has five filter components, indicated generally be reference numeral 204.

Each filter component has an upper, peripherally extending resilient sleeve 206, and a pair of vertically spaced upper and lower annular plates 208 extending around a cylindrical wall 210 the arrangement is such that the sleeves 206 are resiliently vertically compressed between the annular plates 208 of each pair of superimposed filter components 204, so as to seal the components to one another.

The cylindrical walls 210 contain a filter material, e.g. sand, for filtering any particulate material in the incoming liquid.

The filter components 204 are movable clockwise around an endless path by means of an endless drive chain mechanism 212 so as to be located in succession below the inlet pipe 202 and then to move to the right to a location below a suction nozzle 213, which serves to suck up the solid material trapped on the filter components. This action is facilitated by the provision of air outlets 214 underneath the filter components 204 which are located below the suction nozzle 213.

The interior of the tank is partitioned by a wall 216 having a top edge 218 spaced downwardly from the top of the tank so as to form a weir, over which the liquid can flow into a settling chamber 220.

A set of spaced, inclined baffles 222 direct the flow of the liquid through the settlement chamber along a serpentine course, and suction pipes 224, having open tops, are provided at the bottom of the settlement chamber for collecting and removing any solid material which sinks to the pipes 224.

The clarified liquid leaves the tank 200 through an outlet pipe 226.

The liquid may be aerated and passed through a clarification and settlement tank to remove aerated sludge before entering the tank 200, and the solid material removed in the tank may be fed back to the screen 46 of FIG. 1.

If required, the liquid in the settlement chamber 220 may be chlorinated so as to make it drinkable.

Figure 14:
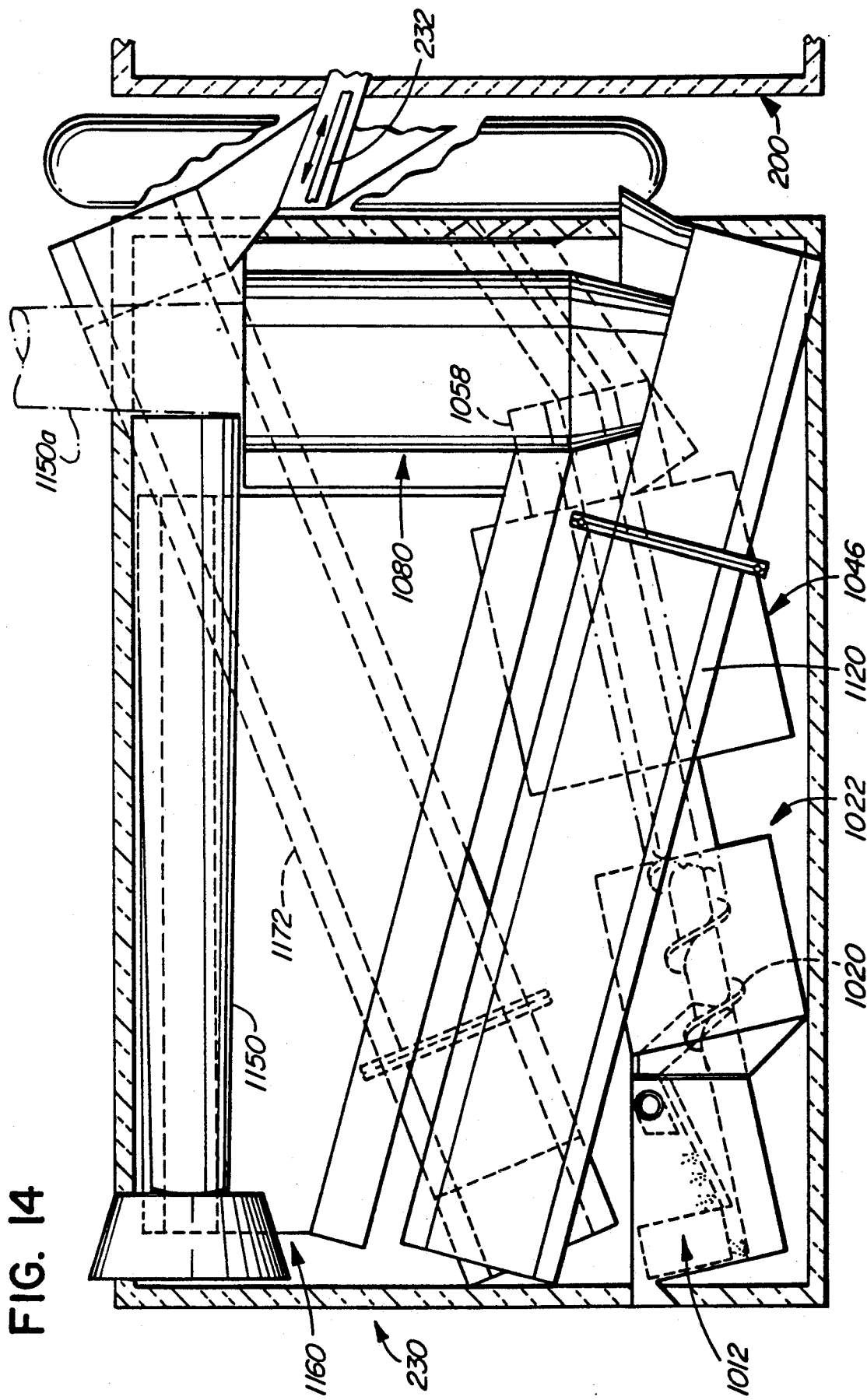
FIG. 14 diagrammatically illustrates a combination, in a single housing, of the apparatuses of FIGS. 1 through 9.

FIG. 14 diagrammatically illustrates how the apparatuses of FIGS. 1 through 9 may be accommodated within a common heat-insulating housing indicated generally by reference numeral 230.

To facilitate understanding of the arrangement of FIG. 14, components of the apparatuses of FIGS. 1 through 9 which are shown in FIG. 14 are indicated by the corresponding reference numerals increased by 1000.

The components of FIG. 1, from the input tank to the extruder are located at the lower portion of the housing 230, as indicated by input tank 1012, auger 1020, screen 1022 and 1046 and extruder 1058.

Pre-composter 1080 is shown at the right-hand end of the housing 230, with auger housing 1120 extending upwardly and to the left.

Second auger housing 1172 is upwardly inclined to the right, and tank 1160 extends between auger housings 1120 and 1172.

Chimney 1150 is shown in full lines in its collapsed condition and in broken lines, at 1150a, in its erected, vertical operational position.

A connection 232 is shown between the tank 230 and the cooling/clarifying tank 200 of FIG. 13.

I claim:

1. Apparatus for composting biological waste material, comprising;
    means for separating the biological waste material into solids and liquids;
    means for adding sludge to the solids to form a mixture therewith;
    means for compacting the mixture;
    means for mixing further sludge with the compacted mixture to form a further mixture therewith;
    means for composting the further mixture;
    means for screening the liquid separated form the biological waste and thereby removing fine solids therefrom; and
    means for adding the fine solids to the first-mentioned mixture prior to the compacting thereof.

2. Apparatus as claimed in claim 1, further comprising auger means for advancing and simultaneously compacting said solids so as to form a compacted mass of said solids for counteracting flow of said sludge rearwardly along said auger means to said separating means.

3. Apparatus as claimed in claim 1, further comprising means for chopping said solids.

4. Apparatus for composting biological waste material, comprising;
    means for separating the biological waste material into solids and liquids;
    means for adding sludge to the solids to form a mixture therewith;
    means for compacting the mixture;
    means for mixing further sludge with the compacted mixture to form a further mixture therewith;
    means for composting the further mixture; and means for mixing the liquid from the biological waste material with the further mixture in said composting means.

means for compacting the mixture;

means for mixing further sludge with the compacted mixture to form a further mixture therewith;

5. Apparatus for claimed in claim 4, further comprising chimney means for condensing gases given off from said compacted mixture during the composting thereof.

6. Apparatus as claimed in claim 4, further comprising means for aerating said compacted mixture to initiate composting thereof prior to the addition of said further sludge thereto.

7. Apparatus as claimed in claim 6, further comprising a settlement tank for receiving the liquid separated from the biological waste material, said means for mixing the liquid comprising means for feeding the liquid from said settlement tank to said composting means for addition to said further mixture, and a heat insulating housing enclosing said aerating means, said settlement tank and said composting means.

8. Apparatus as claimed in claim 7, further comprising chimney means for receiving gases given off from said aerating means, said chimney means including heat exchanger means for condensing said gases as said gases rise within said chimney means.

* * * * *